Aug. 5, 1952     C. J. GLASSER     2,605,961
CARDIOGRAM INTERPRETER

Filed Nov. 20, 1951     2 SHEETS—SHEET 1

INVENTOR.
Charles J. Glasser
BY
Thiess, Olm & Mecklenburger
Attys.

Aug. 5, 1952     C. J. GLASSER     2,605,961
CARDIOGRAM INTERPRETER
Filed Nov. 20, 1951     2 SHEETS—SHEET 2
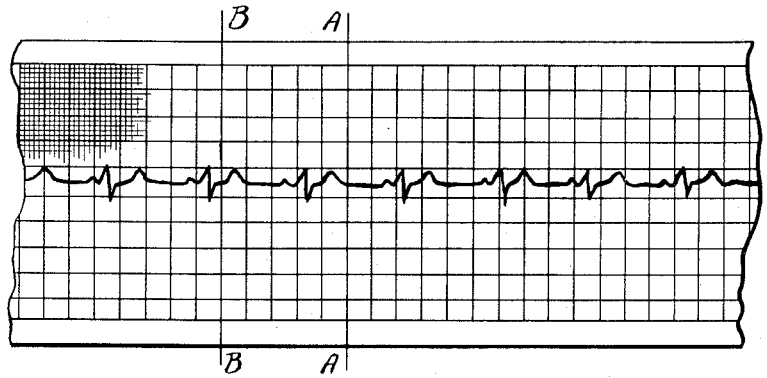
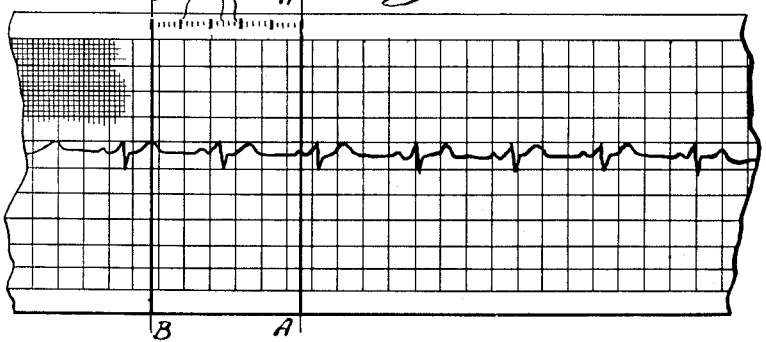
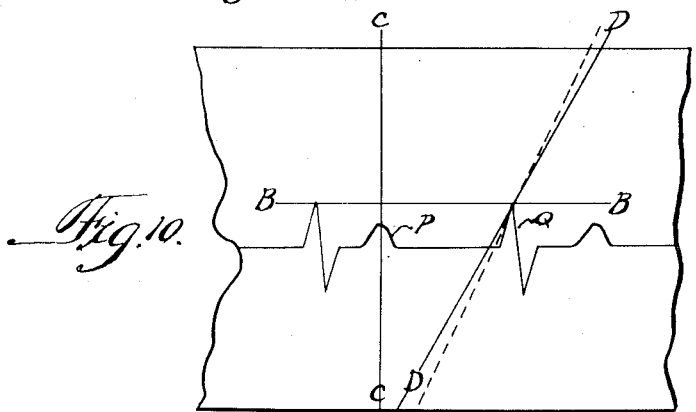
INVENTOR.
Charles J. Glasser
BY
Thiess, Olson & Mecklenburger
Attys Patented Aug. 5, 1952

2,605,961

UNITED STATES PATENT OFFICE 2,605,961

CARDIOGRAM INTERPRETER

Charles J. Glasser, Chicago, Ill.

Application November 20, 1951, Serial No. 257,339

6 Claims. (Cl. 235—61)

This invention relates to apparatus for interpreting cardiograms and it is an object of the invention to provide improved apparatus of that character.

Ideally a cardiogram should be driven at constant speed during recording in order that there may be a constant ratio of longitudinal space intervals to expired time. In practice, however, cardiograms have a variable time scale resulting from variations in speed during recording. True time markings are, however, recorded at the same time in order that the time scale may be determined. It is essential in the interpretation of cardiograms that the expired time corresponding to certain longitudinal space intervals on the cardiogram be determinable to a high degree of accuracy.

Accordingly, it is another object of the invention to provide apparatus which is adjustable in accordance with the true time markings on a cardiogram whereby true indications of expired time may be obtained when the apparatus is employed to scale off a selected longitudinal space interval. It is another object of the invention to provide such apparatus in which the expired time indications may be read most accurately when the longitudinal space intervals scaled off are small.

It is another object of the invention to provide a cardiogram interpreter adapted to be set with extreme accuracy in scaling off a longitudinal space interval and to give a magnified time interval reading. It is another object of the invention to provide such apparatus in which the expired time reading is most sensitive when the longitudinal space interval scaled off by the apparatus is small.

It is another object of the invention to provide a cardiogram interpreter having the characteristics described above while being simple, reliable and economical to manufacture.

This invention, together with further objects and advantages thereof, will best be understood by reference to the following description taken in connection with the accompanying drawings, and its scope will be pointed out in the appended claims.

In the drawings, in which like parts are designated by like reference numerals,

Fig. 8 is a plan view of a typical cardiogram, certain indicator lines of the interpreter illustrated in Fig. 1 being superimposed thereon;

Fig. 9 is a plan view of another type of cardiogram with the same indicator lines of the interpreter superimposed thereon; and Fig. 10 is an enlarged view of a typical cardiogram showing other indicator lines of the interpreter superimposed thereon to show the manner of scaling off longitudinal space intervals on the cardiogram with the interpreter illustrated in Fig. 1.

Figure 1:
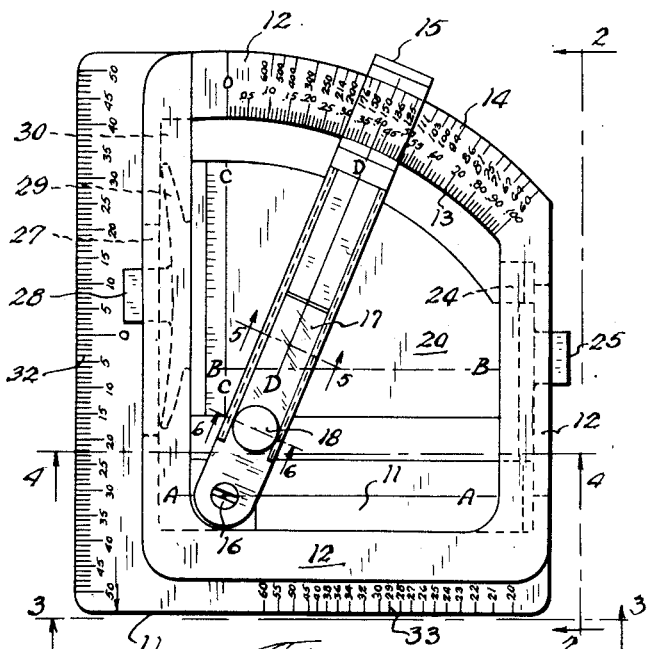
Fig. 1 is a plan view of a cardiogram interpreter illustrating one embodiment of the invention.

The apparatus disclosed in the drawings includes a base 11 having a raised portion 12 extending along the upper and right-hand edges of the base and adjacent the lower and left-hand edges. The upper edge is arcuate and has two scales thereon, both of which may be termed "time scales." The inner scale 13 is intended to indicate expired time while the outer scale 14 is intended to indicate the frequency of a space interval measured by the apparatus in a manner subsequently to be described.

Figure 5:
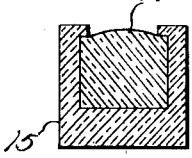
Fig. 5 is a partial cross-sectional view taken along the line 5—5 of Fig. 1.
Figure 4:
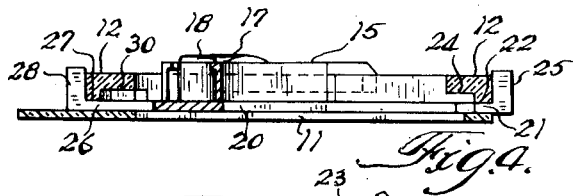
Fig. 4 is a cross-sectional view taken along the line 4—4 of Fig. 1.
Figure 6:
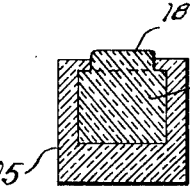
Fig. 6 is a partial cross-sectional view taken along the line 6—6 of Fig. 1.

An arm 15 is pivotally mounted on the base 11 by a screw 16 or other suitable device. The central portion of the arm 15 forms a track as best seen in Figs. 5 and 6 for slidably retaining a magnifying lens 17. This lens facilitates accurate scaling of selected space intervals on a cardiogram and thereby increases the accuracy of the readings obtained by the device. A button 18, which may be integral with the magnifying lens 17, is provided to facilitate sliding the lens along the length of the arm 15.

Figure 2:
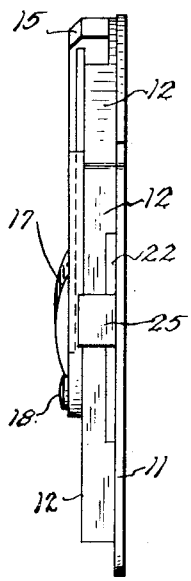
Fig. 2 is a side elevation of the same interpreter viewed from the line 2—2 of Fig. 1.
Figure 3:
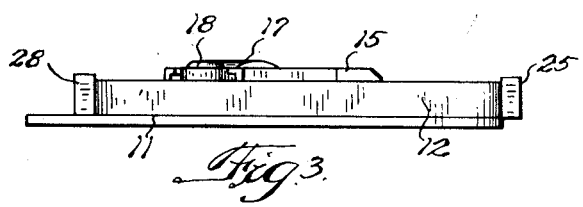
Fig. 3 is an end view taken along the line 3—3 of Fig. 1.
Figure 7:
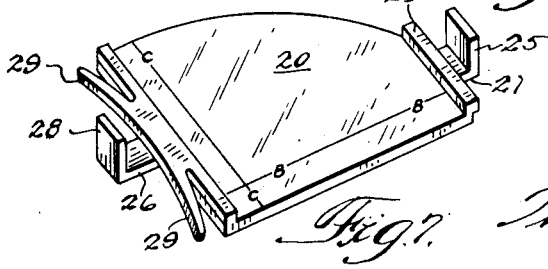
Fig. 7 is a perspective view of a slide member incorporated in the interpreter illustrated in Fig. 1.

A slide member 20 is arranged on the base member 11 for slidable movement with respect thereto. The slide member 20, best seen in Fig. 7, has an arm 21 which extends through a slot 22 in the base member as may be seen by reference to Fig. 2. A shoulder 23 on the slide member slidably engages a groove 24 in the raised portion 12 of the base 11 along the right-hand edge thereof, and the arm 21 of the slide member is upturned to form a lip 25 which engages the outer surface of the raised portion 12 at the right-hand side.

A similar construction is provided at the left-hand edge of the slide member, an arm 26 extending through a slot 27 and having an upturned lip 28 which engages the outer surface of the raised portion 12 of the base along its left-hand edge. A pair of relatively flexible arms 29 are provided on the slide member 20, these arms being arranged within a slot 30 in the raised portion 12 of the base 11 and resiliently engaging the inner wall of that slot as best seen in Fig. 1. The resilient arms 29, bearing against the inner wall of the slot 30, tend to maintain the slide 20 in any given position with respect to the base 11 and insures a linear movement of the slide with respect to the base.

An indicator line AA is provided on the base 11, this line being perpendicular to the pivotal axis of the arm 15 and perpendicular to the direction of sliding movement of the slide member 20 with respect to the base. Another indicator line BB is provided on the slide member 20, this indicator line being parallel to the indicator line AA. A third indicator line CC is provided on the slide member 20, this indicator line being perpendicular to the pivotal axis of the arm 15 and perpendicular to the indicator lines AA and BB. A fourth indicator line DD is provided on the arm 15, this indicator line also being perpendicular to the pivotal axis of the arm 15.

The base 11, the arm 15 and the slide 20 are preferably transparent, at least adjacent the various indicator lines, in order that the lines may be placed over desired points on a cardiogram. In the preferred embodiment these parts are composed of clear plastic in the interest of durability, good visibility, and economy.

In use the interpreter is employed as suggested in Fig. 10 in which only the indicator lines BB, CC and DD of the device are shown in the interest of clarity. Let it be assumed that it is desired to measure the longitudinal space interval between the peak of the hump P on the cardiogram and the peak of the hump Q. The interpreter is laid down over the cardiogram in such a manner that the line BB extends parallel to the horizontal or time coordinate of the cardiogram and with this indicator line passing through the curve at the right-hand end of the space interval which is to be measured. In this instance that point is the peak of the hump Q, and the line BB may be seen to pass directly through that point. At the same time, the line CC is arranged to pass directly through the left-hand end of the space interval to be measured, in this instance the peak of the hump P. If desired the arm 15 may be swung to such positions that the magnifying lens 17 lies over these points as the interpreter is positioned.

The arm 15 is now swung to such a position that the indicator line DD also passes through the right-hand end of the space interval to be measured, or to the position in the illustrated example in which it passes through the point at the peak of the hump Q. A reading may now be taken from either of the time scales 13 and 14, this reading corresponding accurately to the longitudinal or horizontal space interval between the peaks of the humps P and Q of the cardiogram.

An index is provided on the arm 15 for this purpose and in the illustrated embodiment this consists of an extension of the line DD as may be seen in Fig. 1.

It will be apparent that for a given longitudinal space interval on the cardiogram such as that between the peaks of the humps P and Q the reading obtained on either of the time scales 13 and 14 will depend upon the distance between the indicator line BB and the pivotal axis of the arm 15. If the indicator line BB is relatively far from the pivotal axis of the arm, the angle between the indicator lines DD and CC will be relatively small as indicated by the dotted lines in Fig. 10 and hence a smaller reading will be obtained on the expired time scale 13 and a larger reading will be obtained on the frequency scale 14. In other words, the setting of the indicator line BB with respect to the pivotal axis of the arm 15 determines the ratio of scale readings to longitudinal space intervals which are scaled off. The position of the indicator line BB with respect to the pivotal axis of the arm 15 is adjusted in accordance with the true time markings on the cardiogram, the cardiogram interpreter thereby being adjusted to give correct readings in spite of the fact that the cardiogram may have been recorded at varying speeds.

Two alternative systems are normally employed in placing true time markings on cardiograms. In the example illustrated in Fig. 9 the vertical coordinates are printed on the cardiogram prior to use and true time markings R are printed along one edge of the cardiogram as it is recorded.

In accordance with the system illustrated in Fig. 8 the vertical coordinates, at least, are not printed on the cardiogram prior to use but are instead photographically printed at the same time that the cardiogram is recorded. In either case a heavy mark is printed every $1/5$ second, and intermediate these marks are lighter marks which are recorded every $1/25$ second.

The cardiogram interpreter illustrated in the drawings is adjusted to these time markings by placing the indicator line AA on one true time mark, preferably a heavy mark. Slide member 20 is then adjusted with respect to the base 11 such that the indicator line BB falls on another time mark spaced from the first-mentioned mark by a distance corresponding to a time interval of one second. This adjusts the interpreter to the speed of the cardiogram and accurate readings may be taken as described above in the region of the cardiogram within which the interpreter has been adjusted.

If the cardiogram has been run relatively fast during the recording, the true time markings will be spaced relatively far apart and when the interpreter is adjusted the indicator line BB will be set relatively far from the indicator line AA and hence from the pivotal axis of the arm 15. Accordingly, when the interpreter is employed to scale off a longitudinal space interval such as that between the peak of the humps P and Q, there will be a relatively small angle between the indicator lines CC and DD and a correspondingly small expired time reading obtained on the time scale 13. Since the cardiogram was recorded at relatively high speed it follows that the space interval between the peaks of the humps P and Q has been stretched out and actually represents a smaller expired time interval than would be suggested by the large space interval therebetween.

Conversely if the cardiogram is recorded at relatively slow speed the indicator lines AA and BB will be relatively close together with the result that when a longitudinal space interval is scaled off along the indicator line BB between the indicator lines CC and DD, the angle between the latter two indicator lines will be relatively large and the corresponding time interval indicated on the time scale 13 will be relatively great.

It will now be apparent that an interpreter has been provided which may be adjusted to the speed of the tape during recording, such that true readings of expired time or frequency may be obtained.

The use of indicator lines AA, BB, CC and DD in the form of hair lines on transparent bases permits the setting of these indicator lines on selected points on a cardiogram to an extremely high degree of accuracy. More specifically a much higher degree of accuracy may be obtained, particularly in the actual scaling of space intervals as described in connection with Fig. 10, than could be possible by attempting to set one edge of an opaque member on a selected point on a cardiogram. When the operator is able to see all parts of the hump Q, for example, he can set the indicator lines BB and DD to pass directly through the peak of the hump more accurately than would be possible if opaque members concealed portions of the cardiogram immediately adjacent the peak of the hump.

Because of this feature of the preferred embodiment of applicant's invention, the interpreter has substantial practical advantages aside from its ability to compensate for variations in the speed of the cardiogram at the time of its recording. The hair lines which preferably comprise the indicator lines AA, BB, CC and DD may be set on selected points of a cardiogram with an accuracy far greater than that with which the values of such points might be read directly, even where the vertical, time coordinates are true time markings as in Fig. 8. The reason for this is that in placing a hair line on a selected point of the cardiogram curve, the adjacent portions of the curve being visible, the operator need concentrate only on setting the hair line accurately on the selected point. This extreme accuracy in the adjustment of the hair lines is utilized to advantage by the enlarged time scales 13 and 14, these scales being over twice the length of the space interval scaled off by the device.

If straight time scales 13 and 14 were arranged along a straight upper edge of the base 11 extending substantially parallel to the indicator line AA, it will be apparent that for a given length of the arm member 15, for example the length of the arm shown, the right-hand end of the time scales must be spaced from the pivotal axis of the arm 15 by a distance somewhat less than the length of the arm. The left-hand ends of the time scales then would lie a shorter distance from the pivotal axis of the arm 15. With such an arrangement the expired time scale 13 would be linear, and larger values at the right-hand end of the scale could be read to the same degree of accuracy as the smaller values, that is within a certain small fraction of a second.

In the illustrated embodiment of the invention, the left-hand end of the expired time scale 13, for example, is spread out as compared to the hypothetical case suggested above by moving the left-hand end of the scale farther from the pivotal axis of the arm 15, while retaining the same length of arm. This permits more accurate determination of expired time at the left-hand end of the scale than would be possible in the hypothetical case considered above. This greater sensitivity at the left-hand end of the scale is important, particularly in the case of the expired time scale 13, since the indicated values are small and a degree of accuracy which might be acceptable in relatively large expired time readings at the right-hand end of the scale would be insufficient in the small expired time readings near the left-hand end of the scale.

This is particularly true since one of the more important time intervals to be determined from a cardiogram is a very small one corresponding to the rising slope of certain humps on a cardiogram. These intervals may be on the order of .04 second and must be determined with considerable accuracy since the time required for the heart to raise the pressure from the base line to the peak is dependent largely upon blocks in the circulatory system, these blocks and their effectiveness being one characteristic which cardiograms serve to reveal, provided that the time interval corresponding to the appropriate longitudinal space interval can be determined accurately.

Additional scales 32 and 33 are provided on the preferred embodiment of the interpreter but since they do not form a part of the invention, they will be described only briefly. The scale 32 may be employed to scale off vertical space intervals on a cardiogram and may be calibrated to read these intervals in millivolts or any other desired unit. The scale 33 may be employed to read directly the frequency of recurrence of relatively large longitudinal space intervals on the cardiogram. This scale is provided primarily to determine the frequency of heartbeats where the heartbeats occur at a frequency of less than 60 cycles per second. In the particular embodiment illustrated the scale 14 indicates frequencies of 60 cycles per second or greater (corresponding to expired time intervals of one second or less). The device is of course readily adaptable to scaling off larger time intervals and lower frequencies, but it is generally accepted that there is little point in determining frequencies of less than 60 cycles per second with great accuracy. The scale 33 of course does not compensate for variations in the speed of the cardiogram during recording.

The illustrated embodiment of the invention is easily and accurately adjusted to the speed of the cardiogram during recording, it indicates expired time or frequency corresponding to a selected longitudinal space interval on the cardiogram, compensated to the speed of the cardiogram during recording, and is so constructed as to permit accuracy in the scaling off of the longitudinal space intervals far beyond that of previously known instruments and utilizes this accuracy to advantage through the employment of expanded time scales. Still further the time scales are so arranged as to be expanded most in that portion of the scale which indicates small time intervals and high frequencies. These features of the invention, among others, both individually and in combination, comprise a substantial advance in the art.

While a particular embodiment of the invention has been shown, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. Apparatus for measuring longitudinal space intervals on a cardiogram in terms of a time function, such cardiogram having been recorded at variable speed and having true time markings recorded thereon, said apparatus comprising a base member having an indicator line thereon, an arm member mounted on said base member for pivotal movement with respect thereto about an axis perpendicular to and intersecting said indicator line, said arm member having an indicator line thereon perpendicular to and intersecting said axis, a time scale on said base member, an index on said arm member for cooperating with said scale, and a slide member mounted on said base member for slidable movement in a direction perpendicular to said axis and to said indicator line on said base member, said slide member having an indicator line thereon extending parallel to said indicator line on said base member, said slide member having another indicator line thereon extending perpendicular to and intersecting said axis and perpendicular to said indicator line on said base member.

2. Apparatus for measuring longitudinal space intervals on a cardiogram in terms of a time function, such cardiogram having been recorded at variable speed and having true time marking recorded thereon, said apparatus comprising a base member having an indicator line thereon, an arm member mounted on said base member for pivotal movement with respect thereto about an axis perpendicular to and intersecting said indicator line, said arm member having an indicator line thereon perpendicular to and intersecting said axis, a time scale on said base member, an index on said arm member for cooperating with said scale, and a slide member mounted on said base member for slidable movement in a direction perpendicular to said axis and to said indicator line on said base member, said slide member having an indicator line thereon extending parallel to said indicator line on said base member, said slide member having another indicator line extending perpendicular to and intersecting said axis and perpendicular to said indicator line on said base member, each of said members being transparent adjacent the respective lines thereon whereby said lines and intersections thereof my readily be set on selected points on such cardiogram.

3. Apparatus for measuring longitudinal space intervals on a cardiogram in terms of a time function, such cardiogram having been recorded at variable speed and having true time markings recorded thereon, said apparatus comprising a base member having an indicator line thereon, an arm member mounted on said base member for pivotal movement with respect thereto about an axis perpendicular to and intersecting said indicator line, said arm member having an indicator line thereon perpendicular to and intersecting said axis, a time scale on said base member, an index on said arm member for cooperating with said scale, and a slide member mounted on said base member for slidable movement in a direction perpendicular to said axis and to said indicator line on said base member, said slide member having an indicator line thereon extending parallel to said indicator line on said base member, said slide member having another indicator line extending perpendicular to and intersecting said axis and perpendicular to said indicator line on said base member, said time scale and said index indicating true values of said time function corresponding to a longitudinal space interval scaled off between said indicator line on said arm and said second-mentioned indicator line on said slide member along said first-mentioned indicator line on said slide member after said first-mentioned indicator line on said slide member has been adjusted with respect to said indicator line on said base member in accordance with said true time markings.

4. Apparatus for measuring longitudinal space intervals on a cardiogram in terms of expired time, such cardiogram having been recorded at variable speed and having true time markings recorded thereon, said apparatus comprising a base member having an indicator line thereon, an arm member mounted on said base member for pivotal movement with respect thereto about an axis perpendicular to and intersecting said indicator line, said arm member having an indicator line thereon perpendicular to and intersecting said axis, an expired time scale on said base member, an index on said arm member for cooperating with said scale, and a slide member mounted on said base member for slidable movement in a direction perpendicular to said axis and to said indicator line on said base member, said slide member having an indicator line thereon extending parallel to said indicator line on said base member, said slide member having another indicator line extending perpendicular to and intersecting said axis and perpendicular to said indicator line on said base member.

5. Apparatus for measuring longitudinal space intervals on a cardiogram in terms of expired time, such cardiogram having been recorded at variable speed and having true time markings recorded thereon, said apparatus comprising a base member having an indicator line thereon, an arm member mounted on said base member for pivotal movement with respect thereto about an axis perpendicular to and intersecting said indicator line, said arm member having an indicator line thereon perpendicular to and intersecting said axis, an expired time scale on said base member, an index on said arm member for cooperating with said scale, and a slide member mounted on said base member for slidable movement in a direction perpendicular to said indicator line on said base member, said slide member having an indicator line thereon extending parallel to said indicator line on said base member, said slide member having another indicator line extending perpendicular to and intersecting said axis and perpendicular to said indicator line on said base member, said time scale and said index indicating true expired time corresponding to a longitudinal space interval scaled off between said indicator line on said arm and said second-mentioned indicator line on said slide member along said first-mentioned indicator line on said slide member after said first-mentioned indicator line has been adjusted with respect to said indicator line on said base member in accordance with said true time markings.

6. Apparatus for measuring longitudinal space intervals on a cardiogram in terms of expired time, such cardiogram having been recorded at variable speed and having true time markings recorded thereon, said apparatus comprising a base member having an indicator line thereon, an arm member mounted on said base member for pivotal movement with respect thereto about an axis perpendicular to and intersecting said indicator line, said arm member having an indicator line thereon perpendicular to and intersecting said axis, an expired time scale on said base member, said indicator line on said arm member being extended to form an index for cooperating with said scale, and a slide member mounted on said base member for slidable movement in a direction perpendicular to said axis and to said indicator line on said base member, said slide member having an indicator line thereon extending parallel to said indicator line on said base member, said slide member having another indicator line extending perpendicular to and intersecting said axis and perpendicular to said indicator line on said base member, said time scale and said index indicating true expired time corresponding to a longitudtnal space interval scaled off between said indicator line on said arm member and said second-mentioned indicator line on said slide member along said first-mentioned indicator line on said slide member after said first-mentioned indicator line on said slide member has been adjusted with respect to said indicator line on said base member in accordance with said true time markings.

CHARLES J. GLASSER.

REFERENCES CITED

The following references are of record in the file of this patent:

UNITED STATES PATENTS

| Number | Name | Date |
| --- | --- | --- |
| 200,060 | Hitt | Feb. 5, 1878 |
| 1,074,439 | Kincaid | Sept. 30, 1913 |
| 2,436,352 | Downs | Feb. 17, 1948 |